US007742062B2

(12) United States Patent
Oisel et al.

(10) Patent No.: US 7,742,062 B2
(45) Date of Patent: Jun. 22, 2010

(54) AUTOMATIC RESETTING METHOD INTENDED FOR A GEOMETRIC MODEL OF A SCENE OVER A PICTURE OF THE SCENE, IMPLEMENTING DEVICE AND PROGRAMMING MEDIUM

(75) Inventors: Lionel Oisel, Pleumeleuc (FR); Ewa Kijak, Dinge (FR); Francois Le Clerc, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1031 days.

(21) Appl. No.: 10/562,666

(22) PCT Filed: Jun. 30, 2004

(86) PCT No.: PCT/EP2004/007098

§ 371 (c)(1),
(2), (4) Date: Jun. 26, 2006

(87) PCT Pub. No.: WO2005/006252

PCT Pub. Date: Jan. 20, 2005

(65) Prior Publication Data

US 2006/0268009 A1 Nov. 30, 2006

(30) Foreign Application Priority Data

Jul. 1, 2003 (FR) .................................. 03 50279

(51) Int. Cl.
*G09G 5/14* (2006.01)
(52) U.S. Cl. ........................ 345/629; 345/619; 345/630
(58) Field of Classification Search .................. 345/629
See application file for complete search history.

(56) References Cited

U.S. PATENT DOCUMENTS 4,566,126 A * 1/1986 Miyagawa et al. .......... 382/283

5,627,915 A * 5/1997 Rosser et al. ............... 382/219
5,808,695 A * 9/1998 Rosser et al. ............... 348/584
5,917,937 A * 6/1999 Szeliski et al. ............. 382/154

(Continued)

FOREIGN PATENT DOCUMENTS

WO WO 93/02524 2/1993

OTHER PUBLICATIONS

Proceedings of the Second IEEE and ACM International Symposium on Mixed and Augmented Reality (ISMAR '03) 0-7695-2006-5/ Live Mixed-Reality 3D Video in Soccer Stadium Takayoshi KoyamaGraduate School of Sciences and Engineering, Itaru Kitahara Intelligent Robotics and Communication Laboratories, ATR Institute International Yuichi Ohta.*

(Continued)

*Primary Examiner*—Javid A Amini
(74) *Attorney, Agent, or Firm*—Robert D. Shedd; Robert B. Levy; Jorge Tony Villabon

(57) ABSTRACT

The invention concerns a device and an automatic resetting method using electronic means intended for a geometric model of a scene over a picture of the scene including fixed references, the electronic means comparing the picture with model having been adjusted in perspective by homography for superimposition of the references. According to the invention, the electronic device calculates a fine homography function $H_f$ for resetting into three phases: a first preliminary phase of determination of an average resetting homography consisting in determining an average homography function $H_m$ applicable to the model with average adjustment over a sample of pictures of the scene taken previously, a second, rough resetting phase consisting after application of the average homography function $H_m$, to the model in determining a rough homography function $H_g$, and a third, fine resetting phase consisting after application of the rough homography function Hg to the model in determining the fine homography function $H_f$.

14 Claims, 1 Drawing Sheet

Original picture    Horizontal card    Horizontal card

Vertical card    Vertical card

Figure 1:
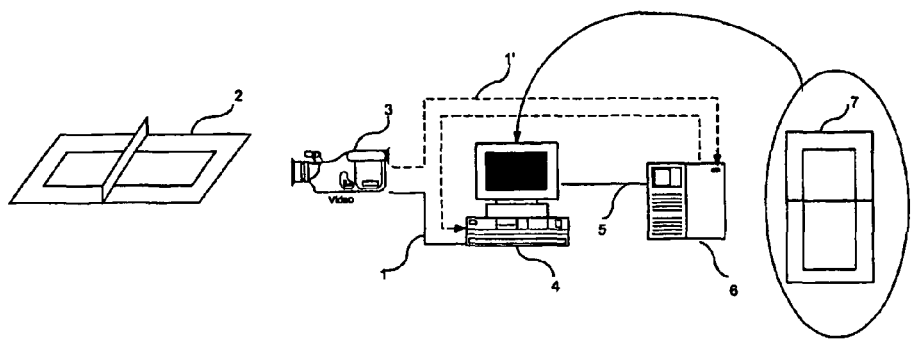

Binary cards (gradient + colour)    Algebraic distance cards

U.S. PATENT DOCUMENTS

| | | | |
|---|---|---|---|
| 6,100,925 A * | 8/2000 | Rosser et al. | 348/169 |
| 6,184,937 B1 * | 2/2001 | Williams et al. | 348/515 |
| 6,377,257 B1 * | 4/2002 | Borrel et al. | 345/419 |
| 6,446,261 B1 * | 9/2002 | Rosser | 725/34 |
| 6,668,080 B1 * | 12/2003 | Torr et al. | 382/173 |
| 6,733,138 B2 * | 5/2004 | Raskar | 353/94 |
| 6,750,919 B1 * | 6/2004 | Rosser | 348/584 |
| 6,774,889 B1 * | 8/2004 | Zhang et al. | 345/173 |
| 7,097,311 B2 * | 8/2006 | Jaynes et al. | 353/122 |
| 7,342,572 B2 * | 3/2008 | Zhang et al. | 345/173 |
| 2002/0167512 A1 | 11/2002 | Lee et al. | |
| 2007/0133841 A1 * | 6/2007 | Zhang et al. | 382/103 |

OTHER PUBLICATIONS

International Journal of Computer Vision 49(2/3), 117-141, 2002 Linear Multi View Reconstruction and Camera Recovery Using a Reference Plane Carsten Rother and Stefan Carlsson.*

R.T. Collins et al: "Matching perspective views of coplanar structures using projective unwarping and similarity matching", Computer Vision and Pattern Recognition, 1993, Proceedings CVPR '93, Loa Alamitos, CA. USA, Jun. 15, 1993, pp. 240-245.

D. Chetverikov et al.: "Matching for shape defect detection", Lecture Notes in Computer Sciences, vol. 1689, 1999, pp. 367-374.

Z. Zhang: "Determining the Epipolar Geometry and Its Uncertainty: A Review", International Journal of Computer Vision, Kluwer Academic Publishers, Norwall, US, vol. 27, No. 2, Mar. 1, 1998, pp. 161-195.

D-G. Sim et al: "Object Matching Algorithms Using Robust Hausdorff Distance Measures", IEEE Transactions on Image Processing, IEEE Inc., New York, US, vol. 8, No. 3, Mar. 1999, pp. 425-429.

D.-K, Kim, et al.: "A planar perspective image matching using point correspondences and rectangle to quadrilateral mapping" Fifth IEEE Southwest Symposium on Image Analysis and Interpretation, 2002, pp. 87-91.

O. Faugeras: "Three dimensional computer vision-a geometric viewpoint", 1993, MIT Press, pp. 98-102.

Search Report Dated Nov. 5, 2004.

* cited by examiner

Original picture   Horizontal card   Horizontal card

Vertical card   Vertical card

Binary cards (gradient + colour)   Algebraic distance cards

AUTOMATIC RESETTING METHOD INTENDED FOR A GEOMETRIC MODEL OF A SCENE OVER A PICTURE OF THE SCENE, IMPLEMENTING DEVICE AND PROGRAMMING MEDIUM

The present invention concerns an automatic resetting method, notably using electronic means, an implementing device as well as a programming medium, intended for resetting a geometric model of a scene over a picture of the scene. It finds applications in activities implementing the processing of pictures and wherein one seeks to superimpose a visual model representing a scene according to a particular viewpoint and a particular vision angle on a real picture of the scene taken according to another viewpoint and/or angle.

The invention is more particularly intended for scenes which exhibit references in the form of lines contrasted with respect to the remainder of the scene and, notably, of the sports grounds with reference marking and delineating lines. The resetting between the model and the picture enables to place an action unfolding on the scene in a significant context provided by the model and linked with its structuration (location on the scene, knowledge of the usual actions of the location . . . ). The invention enables therefore structuration of the picture. The pictures are notably video pictures.

Processes for analysing digitalised, video pictures or others, enabling to extract automatically the characteristics of the picture, are known already. Such processes implement two approaches. The first, which is a general approach, is operational regardless of the type of picture processed. The second, which is a specialised approach, is adapted to the type of the picture to be processed. With the first, the results obtained are relatively poor.

It is therefore desirable to specialise the analysing processes relative to the type of the picture. A particular type of picture has structuration elements which are particularly interesting for this object and these are the broadcasting pictures of sportive events taking place on particular grounds having reference marking and delineating lines. Indeed, besides the fact the rules of the game are generally quite simple, which enables structuration of the match and easy recognition of the characteristic actions, the location whereon the action takes place, is fixed and its spatial structure is known a priori relative to references which are relatively simple to detect, i.e. lines or curves. By way of example, running or racing circuits may be mentioned (athletics or sports cars), European or American football pitches, basketball pitches, and tennis grounds. For the latter, it is generally possible to known in advance the sequence of operations of a game, i.e. the possible chaining of the game phases (temporal action structuration), the universal model of the ground with the accurate dimensions of the different lines (spatial structuration), the number of players, etc.

Several solutions have already been suggested for solving the problem associated with the resetting of a sports ground model on pictures. Three examples may be mentioned, regarding three different types of sport, i.e. tennis, football (soccer), the American football.

For tennis, in the article of G. Sudhir, J. Lee and A. Jain, entitled <<Automatic classification of tennis video for high level content-based retrieval>> Technical Report, August 1997, The Hong-Kong University of science and technology, one endeavours to find thee perpendicular lines in the picture (a service square, for example) in order to calculate the position of the other lines knowing the theoretic form of a tennis ground. The first step regarding the recognition of three lines, is carried out by a line-tracking algorithm restricted by advance knowledge of the seeking direction (horizontal to the right, then vertical upwards, and finally horizontal to the left). This algorithm is initialised by a point selected heuristically in the centre of the picture. The major defects of this approach are the lack of robustness in the positioning of the starting point, also in case of the absence of one of the three perpendicular lines (noise in the picture, lines partially effaced) and the lack of verification of the adequation between all the resetted lines and the lines in the picture (only the three base lines are tested). Finally, the process suggested leads to rather slow an algorithm, little appropriate to real-time processing.

As regards football, in the article of Y. Gong T. S. Lim, and H. C. Chua, entitled <<Automatic Parsing of TV Soccer Programs>> IEEE International Conference on Multimedia Computing and Systems, May, 1995, pp. 167-174, the following steps are implemented: Contour detection by a Laplace-Gauss filter; Filtering of contour information by using the white colour of the lines; Form recognition (ellipse, triangle, rectangle . . . ) giving a number of primitives and analysis of the spatial relations between primitives enabling to identify the point of the ground where the action the game is taking place. Such process is particularly adapted to the football pitch by reason of the heterogeneity of the primitives sought (kick-off area, penalty area, goal. . . ). It proves more difficult to apply to a ground model which exhibits a large symmetry such as a tennis ground. Moreover, it does not provide any resetting of the ground properly speaking, but rather recognition of the position on the ground (close to goals, in the centre . . . ).

Finally, as regards American football, in the thesis of S. Intille, entitled <<Visual Recognition of Multi-Agent Action>>. Phd Thesis, MIT, September 1999, the characteristics of the American football ground are used in order to recognise the point when the game action is taking place. To do so, one uses the markings on the ground. These are composed of figures and of lines distributed every <<10 yards>>. These pieces of information are collected within a theoretic ground model. The method suggested then consists in matching n (n>=4) points of the picture with n points of the theoretic ground. To do so, a line detection algorithm based on Cany-Deriche filtering is used. The intersections of the different straight lines found form a collection of particular points serving for resetting with respect to the theoretic model. The initial resetting is performed manually on the first picture while associating 4 points identified in the picture with their counterpart in the theoretic model. For the following pictures, an algorithm for compensation of the dominant movement enables to track the matching points throughout the sequence. The shortcomings of such method are mainly the use of manual initialisation, the sensitivity of the line detection algorithm and the difficulty of adaptation to a more complex ground model which does not exhibit any equivalent ground markings.

The present invention suggests an alternate method which does not resort to manual initialisation of the resetting algorithm for each video sequence processed. It is moreover robust to the problem associated with contour detection, which is not the case of the methods described previously. Within the framework of the invention, the terms ground and scene are considered as equivalent.

Thus, the invention concerns, an automatic resetting method using electronic means intended for a geometric model of a scene over a picture of the scene, the model and the picture of the scene being stored in the memory of an electronic device in the form of pixel matrices, the scene including fixed references with respect to the remainder of the scene, whereas the references may be specifically detected within the matrices, the picture being taken by a camera arranged in a given zone with respect to the ground in a location of the zone and according to a shot angle determined relative to the scene, the electronic means comparing the picture with the model having been adjusted in perspective by nomography for superimposition of the references.

According to the invention, the electronic device calculates a fine nomography function $H_f$ for resetting into three main steps:

a first preliminary phase of determination of an average resetting homography consisting in determining an average homography function $H_m$ applicable to the model with average adjustment over a sample of pictures of the scene taken previously, a second, rough resetting phase consisting after application of the average homography function $H_m$ to the model in determining a rough homography function $H_g$, a third, fine resetting phase consisting after application of the rough homography function $H_g$ to the model in determining a fine homography function $H_f$.

It should be noted as of now that, as can be seen later on, the shot location and/or the shot angle may evolve from one picture to the other inasmuch as the model remains partially visible in the picture (the visibility limit criterion will be defined at a later stage). In diverse implementation modes of the invention, whereas the following means may be used alone or in combinations according to all technical possibilities, are employed:

the scene possesses reference delineating or marking lines, i.e. at least 4 reference lines, non-parallel 3 by 3, the reference lines are reduced to points and the scene possesses at least 4 reference points, non-aligned 3 by 3, in the preliminary phase of determination of an average resetting homography, at least one sample picture is selected among a collection of pictures taken of the given location, the references on the sample picture(s) are detected and one calculates an average homographic function $H_m$ enabling superimposition between the model subjected to the average homographic function and the sample picture(s), superimposition being reached for least error square minimization of the distance between reference points of sample picture(s) and the model subjected to the average homographic function, in the second, rough resetting phase:

in a first step, an extraction process is applied to the picture enabling, according to detection criteria, to detect in the picture matrix of the pixels liable to represent references of the scene (but hence seen according to the shot location and the shot angle) and to form a first binary matrix $M_{rh}$ of picture reference including horizontal contour points (also called vertical gradient points) and a second binary matrix $M_{rv}$ of picture reference including vertical contour points (also called horizontal gradient points), in a second step, one calculates for each horizontal reference binary matrix $M_{rh}$, respectively vertical reference binary matrix $M_{rv}$, a horizontal reference distance matrix $M_{dh}$, respectively a vertical reference distance matrix $M_{dv}$, including for each element of the matrix the distance value with respect to the closest reference according to the vertical line, respectively the horizontal line, for the horizontal reference distance matrix $M_{dh}$ each element of said matrix specifying the distance in number of pixels relative to the reference line along a vertical axis, the distance values on the reference line and those of a column without any reference line pixel being nil, the distance values along the vertical line increasing in absolute value as the element moves away relative to the reference line, the distance values of the elements being of opposite signs on both sides of the reference line, for the vertical reference distance matrix $M_{dv}$, each element of said matrix specifying the distance in number of pixels relative to the reference line along a horizontal axis, the distance values on the reference line and those of a line without reference line pixel being nil, the distance values along the horizontal line increasing in absolute value as the element moves away relative to the reference line, of the elements being of opposite signs on both sides of the reference line, in a third step, all the reference lines of the model are applied the average homographic function $H_m$ in order to produce a binary average adjusted matrix $M_{am}$ which is compared with the vertical $M_{dv}$, respectively horizontal $M_{dh}$ reference distance matrices, for pixel matching purposes, with for each pixel $p(i,j)$ of the average adjusted matrix derived from a resetted pixel of the model belonging to a vertical reference line and positioned at the line i and at the column j of the average adjusted matrix $M_{am}$, the allocation of a corresponding pixel obtained by adding the value v in i and j of the vertical reference matrix $M_{rv}$ to the value j, and matching the pixels $((i,j), (i,j+v))$, with for each pixel $p(i,j)$ of the average adjusted matrix derived from a resetted pixel of the model belonging to a horizontal reference line and positioned at the line i and at the column j of the average adjusted matrix $M_{am}$, the allocation of a corresponding pixel obtained by adding the value v in i and j of the horizontal reference matrix $M_{rh}$ to the value i, and matching the pixels $((i,j), (i+v,j))$, a homography function $H_{opt}$ is then calculated by regression with minimisation of the medial of the square of the distance between pairs of matched pixels, the calculation being carried out over n collections of four pairs of matched pixels, in a fourth step, one identifies the pairs of pixels corresponding to non-aberrant matches, in a fifth step, $H_{opt}$ is adjusted by least square regression calculation over all the non-aberrant pixel pairs in order to produce the rough homography $H_g$, in the binary average adjusted matrix $M_{am}$, the pixels take on the value 1 if they correspond to a reference pixel of the resetted model and 0 if not, in the fourth step of the second, rough resetting step, a pair of pixels corresponds to a non-aberrant match, if, for the pixel of the average adjusted matrix $M_{am}$ of the match in question, the distance between the pixel matched by using the reference matrices $M_{rh}$, $M_{rv}$, and that obtained by the homography $H_{opt}$ is smaller than or equal to a preset threshold, the reference detection criteria are chosen individually or in combination among:

a specific colour of the reference with respect to the remainder of the scene, a specific tone of the reference with respect to the remainder of the scene, a specific grey level of the reference with respect to the remainder of the scene, a specific shape of the reference, notably a line, an angle between two lines crossing each other, a parallelism between two lines, a specific orientation of the reference,
a line closest and parallel to an edge of the picture matrix,
the extraction process comprises a preliminary Cany-Deriche filtering step of the picture in order to obtain a gradient picture and the processing resumes with the gradient picture,
in the third, fine resetting phase the rough homography $H_g$ is applied to the model and the result is compared with both horizontal and vertical distance matrices with adjustment of the homography by a so-called Powel alternate single-dimension iterative minimisation method,
the matrix of the model is a binary matrix whereof all the pixels regarding the references have a first value and the other pixels a second value in order to dispense with the detection of the references in said matrix of the model when implementing the phases and steps of the method,
the pictures evolve with time according to of the sequences corresponding to different shot locations and/or angles and the electronic device comprises means enabling moreover to determine during the first, average resetting preliminary phase as many average nomography functions $H_m$ as there are different shot locations and angles,
the phases and steps are implemented in the electronic means which are programmable logic units with a programme and the programmable logic comprises a microprocessor or a digital signal processor (DSP) and, preferably, of the general-purpose or dedicated microcomputer type,
the scene is a sports ground including references in the form of delineating lines, notably a European or American "football" pitch or a tennis ground,
electronic means are implemented which are wired logic units,
the wired logic unit comprises at least one integrated circuit,
electronic means are implemented which are programmable logic units with a programme,
the programmable logic unit comprises a microprocessor or a digital signal processor (DSP) and are, preferably, of the general-purpose or dedicated microcomputer type.

The invention also concerns an automatic resetting device using electronic means intended for a geometric model of a scene over a picture of the scene, the model and the picture of the scene being stored in the memory of an electronic device in the form of pixel matrices, the scene including fixed references with respect to the remainder of the scene, whereas the references may be specifically detected within the matrices, the picture being taken by a camera arranged in a given zone with respect to the ground in a location of the zone and according to a shot angle determined relative to the scene, the electronic means comparing the picture with the model having been adjusted in perspective by homography for superimposition of the references.

According to this invention, the device comprises means enabling to calculate a fine homography function $H_f$ for resetting into three main phases:
a first preliminary phase of determination of an average resetting homography consisting in determining an average homography function $H_m$ applicable to the model with average adjustment over a sample of pictures of the scene taken previously,
a second, rough resetting phase consisting after application of the average homography function $H_m$ to the model in determining a rough homography function $H_g$,
a third, fine resetting phase consisting after application of the rough homography function $H_g$ to the model in determining a fine homography function $H_f$.

The device of the invention further comprises means enabling the execution of the method listed previously and of all its variations, individually or according to all their combinations.

In a variation of the device, the electronic means are of the general-purpose or dedicated microcomputer type.

The invention also concerns an information storage medium including a programme intended for operating the former device.

The invention finally concerns an information storage medium including a programme intended for operating the former device and at least according to one of the methodological modalities among to all the modalities, including those resulting from any possible combinations, listed previously.

Figure 2:
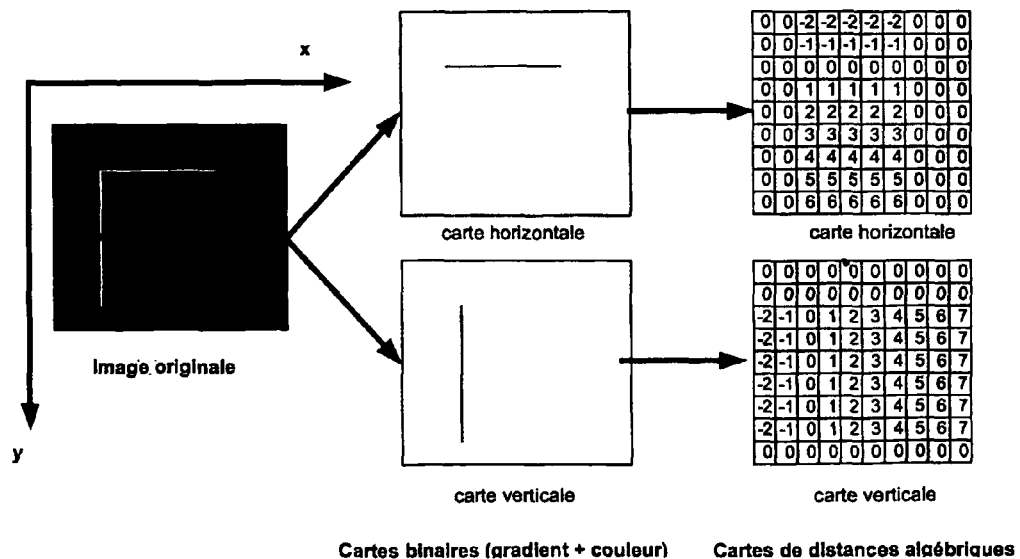

The present invention will now be exemplified by the following description, without being limited thereto, and in relation with:

FIG. 1 which represents an example of device for implementation of the invention and, FIG. 2 which represents data generated for a rough resetting step with contour algebraic gradient and distance cards.

The invention is now explained while taking as an example the resetting of a model of tennis ground over a picture coming from a game video sequence over such a ground, but which is generally taken according to another viewpoint than that of the model. The tennis ground, advantageously, has dimensions which are perfectly known and reference lines perfectly defined. The object is the resetting of all the pieces of spatial information extracted from the video pictures, for example position and trajectory of the players or of the ball, relative to a common referential which is the model. The resetting enables to define a transformation which may be then used for all the elements of the picture. It should be noted that according to what wants to be transformed, the model or a picture, one will use the direct transformation or its reverse. This enables, in later phases, not covered in this application, to identify the phases of the game (service, volley . . . ).

In this example, one uses a number of hypotheses which are that the shots of the video pictures are made from a high location behind the smaller side of the ground and that the major portion of the ground is visible on the pictures. However, the invention is applicable to pictures taken from another view point, notably on the larger sides. Moreover, one assumes that the ground lines are white (the invention is however adaptable to any colour of line which may be extracted from a picture of the ground). Finally, one assumes that the playing surface and hence the colour of the ground is not known in advance in order to be able to analyse the pictures of events on clay or grass tennis grounds and, also, that the positioning of the players is a random one.

Building up on these hypotheses, one has determined a method which may be transposed into algorithmic form so that it may be implemented automatically in electronic means, notably a microprocessor or digital signal processor-based computer system. The method uses the lines of the ground and more particularly the contour lines in order to reduce the quantity of calculations necessary. However, the invention may be applied to all the reference delineating and marking lines of the ground under the condition there are at least 4 reference lines, non-parallel 3 by 3 or 4 reference-points non-aligned 3 by 3.

With the method suggested, a piece of electronic equipment enables to deform automatically the theoretic ground model represented by delineating lines in order to match as well as possible the resetted lines with the actual lines of the court which appear on the video pictures. In the computer equipment, the pictures as well of the model as the actual ones of the video, are in digital format and are stored in lines× columns matrices for the calculations. Preferably the model corresponds to a binary picture of the scene (court) wherein the reference lines have a different value from of the remainder of the scene. Preferably, the picture matrices, the model matrices and those calculated have the same size in order to simplify the calculations and to avoid needing to take into account a reduction factor or an enlargement factor. However, the invention may be applied in its principle to model and picture matrices of different sizes.

An example of device for implementation of the invention is represented on FIG. 1 and, preferably, the invention is implemented with programmable electronic circuits, notably a dedicated microcomputer or data-processing equipment and one has represented on that figure data-processing means. A video camera 3 takes a shot of a scene 2 which is here a tennis ground. The shot including a sequence of pictures is transmitted in the form of video data 1 to a microcomputer 4 enabling to perform the operations in relation with the invention and to store at least the picture under processing. In a circular box on the right of FIG. 1 and in relation by an arrow with the microcomputer 4 one has also represented a model 7 of tennis ground to indicate that the microcomputer also stores a representation of the model of the scene. The direct link between the camera 3 and the microcomputer enables direct processing of the video flux 1 which may be stored thereon. However, one has also represented as a dotted line, a video link 1' between the camera 3 and a means 6 for storing the video flux for its first part and between the storage means 6 and the microcomputer 4 for its second part, in order to show that the invention may also apply to pre-recorded video. The storage means 6 is represented in the form of a server, but it is also possible to use analogue storage means. However, it should be well understood that automated processing is carried out in a piece of equipment implementing logic/digital calculations, micro-processor or digital signal processor (DSP), and that, if an analogue video signal is transmitted, an analogue/digital conversion is carried out before automated processing. Preferably, the video flux is a flux of digital data.

One also understands that the term microcomputer may cover any electronic computer equipment compatible and possibly dedicated of the graphic workstation type. Alternately, the microcomputer may be replaced with a wired circuit specifically realised to conduct the operations in relation with the invention. The wired circuit (one or several integrated circuits) may possibly be arranged on an electronic card within a microcomputer. Finally, the raw video data leading to particularly important data flux, the invention may also operate on compressed video data, whereas the pictures are decompressed during processing, or the processing is suited to the type of compression used. In particular certain compression systems enable to suppress redundant data in a picture and a small quantity of data provides information regarding the homogeneity or the complexity of said picture, which may also enable the selection of the shots.

Resetting is carried out globally with a single model of deformation for the whole ground according to a particular shot location of the picture and inasmuch as at least 4 of the references associated with the model are visible. In case when the shot location has been modified, a new model of deformation should be implemented (the average initial deformation model should be changed which implies modification of the results of the later steps). In the case of sequences which alternate shots in different locations, the equipment may be provided beforehand with information on the shot location and one uses the corresponding average resetting function (the method implements a priory step of determination of an average resetting function determined on the basis of a sample of pictures taken in a particular point) or, iterative tests are conducted with several average resetting functions (each corresponding to a particular point) looking for the resetting which is closest according to a distance criterion between resetted model and picture and one uses the average resetting function in question for the remainder. It should be noted once more that, at a later stage, and outside the framework of the present invention which concerns more particularly the resetting between a model and a picture, once the different positions of the players or of the ball have been calculated on the actual picture, they may also be compensated for via the resetting function or its reverse.

The principles at the base of the invention will now be explained, by considering a ground model which corresponds to a ground seen from above, substantially in its centre and symmetrically. The invention may however be implemented with a ground model which corresponds to a different view. Nevertheless, one chooses preferably a view of the model which simplifies the calculations and, especially, the later steps for positioning the elements of the picture.

A function enabling to deform this theoretic ground or model including references crossing each other at right angle, i.e. the model is considered as seen from above substantially in its centre, is therefore sought. One knows that the same ground seen through a camera positioned laterally will exhibit on picture, reference lines in perspective, whereas the vanishing lines are not parallel, contrary to the same lines of the model. The type of projection to used to deform the model and to superimpose said model onto the picture is known and it corresponds to a perspective projection function (the non-linear deformations associated with optical imperfections of the camera are neglected). Under this hypothesis of pure perspective projection, one knows that there exists an exact relation enabling to transform a plane, that of the model, into its projection. This function is the eight-parameter homographic function. Although it is non-linear in Cartesian coordinates, the passage into homogeneous coordinates enables to find linearity between a point of the model and its projection in the picture.

The principle of this transformation ought to be reminded at this point. Let there be $\tilde{p}(x,y,t)$ a point 2D expressed in homogeneous coordinates (the case when t is nil corresponds to a point at infinity in the direction (x,y)). This very point expressed in the Cartesian space will have as coordinates $$p\left(\frac{x}{t}, \frac{y}{t}\right)$$

(a point at infinity cannot be expressed in Cartesian coordinates). In homogeneous coordinates, the homographic transformation is expressed in matrix form, via the matrix H(3×3) defined within one multiplicative coefficient (it possesses 8 independent coefficients). Whatever the homogeneous point $\tilde{p}_{th}^{i}$ expressed in the reference attached to the theoretic ground and $\tilde{p}^{i}$ its counterpart in the picture, one has $\tilde{p}^{i}=\lambda.H.\tilde{p}_{th}^{i}$ with $\lambda$ as a non-zero scalar.

The resetting consists therefore in identifying the homography enabling to reset the theoretic ground, the model, on the actual picture. This type of identification is based on an adjustment iterative calculation which comprises a stopping condition based upon a criterion of quality. Normally, this quality criterion should be based upon the average distance between resetted reference lines and actual reference lines. However, the positioning of the actual lines is not known in advance. Consequently, the quality criterion which is used is a distance criterion to be minimised. Such criterion D(I,H), depending on the picture I and on the homography H, is defined as the integral along the resetted reference lines, of the distance between a point of a resetted reference line and the closest contour point. Its symbolic expression is as follows:

$$D(I, H) = \oint_T d_c(I, H \cdot s) \cdot ds$$

where $d_c$ is the Euclidian distance of the point s resetted by the homography H at the closest contour point in the picture I.

However, the deformation to be applied to the theoretic model is very important and because of its nature highly non-linear in Cartesian coordinates, the homographic transformation is relatively unstable, small variations on the parameters of the third line of the homographic matrix causing very high variations in the position of the resetted points, which is not favourable to efficient automated calculation.

Consequently, the resetting method according to the invention will be carried out in three phases enabling to switch from an approximate initial resetting to a fine-tuned final resetting. The three phases to be conducted are, firstly, an average resetting followed, secondly, by a rough resetting then, thirdly, by a fine resetting. The object of the invention is, by using three resetting phases, to guarantee the production of a satisfactory solution with reduced cost (importance of the calculations) relative to the technique based upon the mathematical transformation in projection presented previously by way of reminder. The average resetting phase uses the fact that the pictures exhibit close spatial characteristics. The rough resetting phase consists in cutting the scene (ground) into vertical and horizontal lines. The fine resetting phase is based upon a minimisation diagram whereof the rapid convergence towards satisfactory minimum is guaranteed by the previous resetting phases.

The resetting method of the invention may be explained in the form of an algorithm:

1. Calculate over a representative set of pictures (sample), the average resetting homography $H_m$
2. Conduct rough picture resetting between the pixels of the resetted model by $H_m$ and their counterparts obtained by the distance cards by:
   a. Calculation of the cards of horizontal and vertical gradients and of the cards of horizontal and vertical distances with respect to their contour points (a contour point being a point whereof the gradient value is greater than or equal to a fixed threshold)
   b. Assessment of all the counterparts (couples) of the points resetted by $H_m$ on the basis of the distance cards,
   c. Robust calculation of the rough homography $H_g$ on the basis of all the couples found (robust calculation consists in taking into account only a portion of the couples, those which satisfy a quality criterion regarding the matching process: the couples corresponding to non-aberrant matches)
3. Conducting the fine resetting by using $H_g$ by: fine-tuning of the parameters of $H_g$ to minimise the actual contour distances on the picture with those of the theoretical ground (the model) resetted by $H_g$.

These three phases will now be described in detail:

a) the average resetting:

This first phase is carried out beforehand and, in case when the shot locations may be different, once at least for any shot location. It should be noted that in case when the shot angle may also evolve significantly, for example further to a <<travelling>> motion or to a rotation of the camera, said step may be carried out on the extreme angles and/or on intermediate shot directions (angular sectors).

A sample representative of pictures of the tennis sequences available for a given shot location (and, possibly a given shot angle) is determined and an average homographic function $H_m$, via least error square minimization of the distance between projected reference points and actual reference points, is calculated. Preferably, this step is carried out manually, an operating matching manually the visible reference angles in the pictures and the reference angles of the model (least square calculation of the average nomography being carried out over all the matches thus obtained). However, such operation may also be conducted semi-automatically, an automaton adjusting the lines roughly and a human operator fine-tuning the adjustment to generate finally the average homographic function $H_m$. Conversely, this may be the human operator who adjusts roughly and the automaton which fine-tunes the adjustment to generate finally the average homographic function $H_m$.

b) the rough resetting

During this phase, two contour algebraic distance cards or matrices are calculated, one for vertical and one for horizontal. The term contour corresponds to reference lines of the ground. To this end and as represented on FIG. 2, on the basis of the original picture 8, pictures of vertical and horizontal gradients are calculated using Cany-Deriche filtering, then thresholding and binarisation relative to detection criteria in order to keep, in this example, only the highly contrasted points, i.e. those which correspond to the reference lines, in order to generate two vertical contour 10 and horizontal 9 cards or matrices, respectively. If necessary, one may refer to the article Deriche, R., <<*Optimal Edge Detection Using Recursive Filtering*>>, Proc. First Conf. on Computer Vision, London, June, 1987 as regards filtering. It should be noted that on FIG. 2, the contour cards 9 and 10 have been filtered moreover in order to generate at the outcome only the highly contrasted points with a grey level higher than a given threshold, whereas at this stage the points belonging to the reference lines are considered as white. It should be noted that one may also take the colour into account to select contour lines or any other specific detection criterion of such contours in the picture (alignment of points, contrast, colour, crossing lines . . . ). Alternately, in case when the reference lines were detectable simply, one may use directly the picture and apply reference line detection criteria without going through the calculation of a gradient. These criteria may be a specific colour of line for example. It should be noted, finally, that it is possible to implement complementary steps enabling to improve the quality of the reference lines detected, notably by expansion, erosion operations . . . over the matrices. This enables for example to gather two portions of the same line which was cut either by the presence of a player in the axis, or by the covering of the ground pushed over the line by a slipping payer (clay ground).

On the basis of two contour cards 9 and 10 thus calculated, one determines the algebraic distance cards with the closest horizontal 11 and vertical 12 contours. To this end, two horizontal (respectively vertical) scans of the vertical 10 (respectively horizontal 11) contour card are carried out by allocating to each pixel the value of the Euclidian distance at the closest contour point (belonging therefore to a reference) on the line (respectively the column) scanned. This distance is negative before the contour point on the line (respectively the column) scanned.

This phase of the method may be explained in the form of an algorithm while considering:

Gh and Gv the cards of horizontal and vertical gradients corresponding to line x column matrices indexed in i,j or in p (e.g. Gh(i,j): value of Gh at the point of coordinates i,j) (e.g. Gv(p): value of Gv at the point p)

Dh and Dv the cards of horizontal and vertical distances corresponding to of the line x column matrices indexed in i,j or in p (e.g. Dh(i,j): value of Dh at the point of coordinates i,j) (e.g. Dv(p): value of Dv at the point p)

I(p) the intensity of the picture I at the point p

1. Calculation of the cards of horizontal Gh and vertical Gv gradients
2. Binarisation of the gradient cards:
   a. Horizontal, for any point p:
      i. If (I(p)>threshold1) && (Gh(p)> threshold2) then Gh(p)=1
      ii. If not Gh(p)=0
   b. Vertical, for any point p:
      i. If (I(p)>threshold1) && (Gv(p)> threshold2) then Gv(p)=1
      ii. If not Gv(p)=0
3. Calculation of the distances Dh and Dv:
   a. Initialise Dh with the value (number of lines +1), i.e. Dh(p)=Nblines+1 $\forall p \in Dh$
   b. Initialise Dv with the value (number of columns +1), i.e. Dv(p)=Nbcolumns+1 $\forall p \in Dv$
   c. Calculation of Dh:
      i. For each column j:
         d=−1;
         n=number of lines
         For (i=0 to n−1)
            a. if Gh(i,j)=1 then d=0
            b. if d !=−1 then
               i. Dh(i,j)=d
               ii. d=d+1
      ii. For each column j:
         d=−1;
         n=number of lines
         For (i=n−1 to 0)
            a. if Gh(i,j)=1 then d=0
            b. if (d !=−1) && (Dh(i,j)>d) then
               i. Dh(i,j)=−d
               ii. d=d+1
   d. Calculation of Dv:
      i. For each line i:
         d=−1;
         n=number of columns
         For (j=0 to n−1)
            a. if Gv(i,j)=1 then d=0
            b. if d !=−1 then
               i. Dv(i,j)=d
               ii. d=d+1
      ii. For each line i:
         d=−1 ;
         n=number of columns
         For (j=n to 0)
            a. if Gv(i,j)=1 then d=0
            b. if (d !=−1) && (Dv(i,j) >d) then
               i. Dv(i,j)=−d
               ii. d=d+1

Thanks to the distance cards 11 and 12 thus calculated, one will determine a rough homography $H_g$ by a trial and error method with minimisation of the criterion D(I,H). In this view, one applies the average homographic function $H_m$ to the model to form an average adjusted model in the form of a matrix of the average adjusted model. The matrix of the average adjusted model and the card of vertical, respectively horizontal, distances are travelled in parallel, in one case horizontally and in the other vertically and the contour points of the picture are matched with their counterparts of the average adjusted model. The points for the picture are obtained on the basis of the card of vertical (respectively horizontal) distances. Two scans are carried out, a horizontal scan and a vertical scan. Thus, if p(x,y) is a point of horizontal (respectively vertical) line of the adjusted model and d the value in (x,y) of the card of horizontal (respectively vertical) distances, then the counterpart of p in the picture will be the point of coordinates (x,y-d) (respectively (x-d,y) ).

The travel of all the matrices (distance cards and matrix of the average adjusted model) provides with a collection including a large number of elements of pairs of matching points which may however contain mistakably matches pairs of points (for example, pixels of the adjusted model non visible in the picture will be matched with the closest points with highest gradient (or outside the picture, failing any gradient points on the line or the column in question. In all cases, a match is provided with the closest point.

All these matches or pairs will now be used for calculating the new matrix of rough homography $H_g$ transforming the theoretic ground points into points belonging to the contour cards. The technique used to this end is not based upon the least squares. Indeed, the card of the contour points, regardless whether horizontal or vertical, often suffers from a significant noise. Certain matches may therefore be quite erroneous and direct least square assessment might lend too much importance to aberrant pairs which might, because of the instability of the homographic model, cause divergence of the resetted model with respect to the actual positioning of the ground in the picture.

One prefers therefore to use a robust method of assessment of the parameters of the rough homography function $H_g$. The object is to separate the matching pairs which are suitably matched from the aberrant matches. There exist several of families of robust assessment techniques. According to a preferred embodiment of the invention, the parameters of the rough homography $H_g$ are calculated in order to meet the least medial square criterion. The calculation method, presented briefly here, is described thoroughly at paragraph 3 of the article of P. Meer, D. Mintz and A. Rosenfeld <<Robust Regression Methods for Computer Vision : A Review >>, published in International Journal of Computer Vision, volume 6 n° 1, 1991, pages 59 to 70, to which may be referred.

According to such method, if one considers H the space of the parameters of the homography, E the collection of the matching pairs (called samples) and $c(p_{th}, p_r)$ a point-pixel pair composed of a pixel of the average adjusted model $p_{th}$ and of a matching contour point $p_r$ in the picture, the least medial square method tends to minimise, in the space H, the medial of the residues calculated on E. The residue in the present case, corresponds to the distance in a pair between the reference point resulting from the application of the current homography function to the model and the matching contour point (reference) on the picture. The homography $H_{opt}$ solution of the problem is the homography minimising such medial:

$$H_{opt} = \min_{H_i \in H} \left( \underset{c \in E}{med} \ d(H_i \cdot p_{th}, p_r)^2 \right)$$

where d is the Euclidian distance between two points.

The solution to the problem of non-linear minimisation calls for iterative search by regression of the homography $H_i$ which minimises the medial of the residues among all the possible homographies. Preferably, in order to limit the calculations, one limits the search to a finite collection of n homographies, defined by n collections of four pairs (or couples) of points taken randomly in E. In implementation variations, one may use eight pairs, possibly sixteen pairs or more, according to the power of calculation available and/or the accuracy requested. For each of the n homographies, one calculates and one sorts the squares from the residues in order to identify the medial square residue. The resulting homography is assessed as that which provides the smallest medial square residue.

Selecting the homography on the single medial square residue, instead of over all the residues, confers to the regression process its robust character. Indeed, it enables not to take into account the residues of extreme values, liable to match aberrant pairs of points and henceforth to distort the regression.

It may be demonstrated statistically. By way of example, in case when eight pairs are used, if P=0.999 the probability that at least one of the n collections of eight pairs does not contain any aberrant couples and supposedly 50% of the data may be false; the number of draws n to be conducted to meet the probability P is then 1765. If the proportion of aberrant samples is smaller than 50%, supposedly, a collection which does not include any aberrant samples provides a resetted model in better keeping with the collection E, thereby showing a medial square residue which is smaller than any other collection including at least one aberrant sample. It is then almost sure that the homography finally obtained is defined by a collection of eight non-aberrant pairs, which guarantees the robustness of the method.

The homography $H_{opt}$ obtained by this regression calculation is now used to identify the aberrant pairs and it is applied to the model to form a new optimal adjusted model. In this view, one calculates the standard deviation $\hat{\sigma}$ of the absolute value of the residues corresponding to the collection of the pairs of points under the hypothesis of an additional Gaussian noise, and any pair whereof the absolute value of the residue exceeds K times $\hat{\sigma}$ is tagged as an aberrant pair. One may advantageously fix the value of the variable K to 2.5. The least medial square calculation method used is a method conventionally known.

The rough homography $H_g$ is finally obtained by least square regression calculation carried out over all the pairs judged as non-aberrant. It should be noted that the calculation of $H_g$ may be fine-tuned further by iterating the process described previously, new matching pairs of points being obtained by applying the homography $H_g$ to the model. One may explain the calculation of the rough homography in the form of an algorithm with:

p1: corresponding in the picture to a point p of the theoretic ground resetted by Hm (average homography)
p2: contour point closest to p1

1. For each point p belonging to the theoretic contour:
   a. p1=Hm (p)
   b. if p is a point belonging to a vertical line p2=p1+Gv(p1)
   c. if not p2=p1+Gh(p1)

2. Robust calculation of the homography on the basis of the collection of the couples (p1, p2) found
   a. Perform n random draws of 4 couples of points
   b. For each draw:
      i. Calculate linearly the nomography on the basis of the 4 couples
      ii. Calculate the medial error
   a. For the homography having given the minimal medial error
      i. Keep the non-aberrant couples (those whereof the absolute value of the residue is smaller than K times $\hat{\sigma}$).
      ii. Recalculate the rough homography Hg on the basis of all these couples c) the fine resetting The previous phase has therefore enabled to generate a matrix of rough homography $H_g$ which is close to the final solution. The present step consists in fine-tuning the parameters of this homography in order to produce a fine homography function $H_f$ so that the model adjusted by said function is closest to the lines in the picture. To do so, a minimisation method of a function of several variables is implemented. This function is derived from the criterion D(I,H) defined previously and one seeks the matrix $H_f$ solution of the following minimisation:

$$H_f = \min_{H_i \in H} \left( \oint_T d_c(l, H_i, s) \cdot ds \right) \quad (1)$$

The function $d_c$ can be broken down as the sum of two components, a vertical one and a horizontal one:

$$d_c(I, H, s) = I_v(s) \cdot d_v(I, H \cdot s) + (1 - I_v(s)) \cdot d_h(I, H \cdot s)$$

$$\text{where} \begin{cases} I_v(s) = 1 \text{ if } S \text{ belongs to a vertical ligne} \\ 0 \text{ if not} \end{cases}.$$

The function $d_v(I,p)$ (respectively $d_h(I,p)$) represents the absolute value of the value at the point p of the card of the vertical (respectively horizontal) distances calculated at the rough resetting phase.

The integral contained in the formula (1) is sampled using a Bresenham line travelling algorithm so as to process only integer coordinates. At the end of the day, the quantity to be minimised can be written as follows:

$$H_f = \min_{H_i \in H} \left( \sum_{p \in B(T,H_i)} (I_v(p) \cdot d_v(l, p) + (1 - I_v(p)) \cdot d_h(l, p)) \right) \quad (2)$$

with $B(T,H_i)$ representing the collection of the pixels (with integer values) belonging to the contour of the ground T resetted by the homography $H_i$.

By reason of the very high non-linearity of the function (2) to be minimised, direct calculation is not possible and one prefers to use an iterative minimisation function of a function with several variables which are here the 8 parameters of the homography $H_f$ to be assessed. Several techniques are possible and notably, statistic methods and determinist methods.

Statistic methods advantageously guarantee the convergence towards the global minimum of the function to be minimised. The related calculation cost is however prohibitive in most applications. Among these usable methods, one may mention the simulated annealing method whereof an implementation may be found, if needed, in <<Numerical Recipes in C>>, P412, The Art of Scientific Computing, Cambridge University Press 2001.

The determinist methods, although convergent, do not ensure final provision of the global minimum of the function. The minimum obtained after convergence is but a local minimum which is often quite close to the initial value wherewith the algorithm is initialised (i.e. the parameters of $H_g$ in our case). However, thanks to the previous steps having enabled to obtain a homography matrix $H_g$ which is close to the final solution, this type of method may be applied with profit.

At first, the gradient of the function to be minimised is not available and, consequently, the techniques exploiting this information in order to ensure rapid convergence of a determinist method algorithm are not applicable. Therefore, a so-called Powell method is applied here. This method is described in detail in the book <<Numerical Recipes in C >>, P412, The Art of Scientific Computing, Cambridge University Press 2001 to which may be referred. It is based upon a principle of alternate single-dimensional minimisations, the minimisation being carried out alternately over the 8 parameters of the homography.

The invention claimed is:

1. An automatic resetting method using electronic means intended for a geometric model of a scene over a picture of the scene, the model and the picture of the scene being stored in the memory of an electronic device in the form of pixel matrices, the scene including fixed references with respect to the remainder of the scene, wherein the references can be detected within the matrices, the picture being taken by a camera arranged in a given zone with respect to the ground in a location of the zone and according to a shot angle determined relative to the scene, the method comprising:
    comparing, via the electronic means, the picture with the model having been adjusted in perspective by homography for superimposition of the references,
    wherein the electronic device calculates a fine homography function, $H_f$, for resetting into at least three main phases:
    a first preliminary phase of determination of an average resetting homography including determining an average homography function, $H_m$, applicable to the model with average adjustment over a sample of pictures of the scene taken previously,
    a second, rough resetting phase including, after application of the average homography function $H_m$ to the model, determining a rough homography function, $H_g$, said second rough resetting phase comprising the steps of:
        applying an extraction process to the picture enabling, according to detection criteria, to detect in the picture matrix of the pixels which can represent references of the scene and to form a first picture reference binary matrix $M_{rh}$, including horizontal contour points and a second picture reference binary matrix, $M_{rv}$, including vertical contour points,
        calculating for each horizontal reference binary matrix, $M_{rh}$, a horizontal reference distance matrix $M_{dh}$, including for each element of the matrix the distance value with respect to the closest reference according to the vertical line,
        calculating for each vertical reference binary matrix, $M_{rv}$, a vertical reference distance matrix $M_{dv}$, including for each element of the matrix the distance value with respect to the closest reference according to the horizontal line,
        applying all the reference lines of the model to the average homographic function $H_m$ in order to produce a binary average adjusted matrix $M_{am}$ which is compared with the vertical $M_{dv}$, and respective horizontal $M_{dh}$ reference distance matrices, for pixel matching purposes, and calculating a homography function $H_{opt}$ by regression with minimization of the medial of the square of the distance between pairs of matched pixels,
        identifying the pairs of pixels corresponding to non-aberrant matches,
        adjusting the homography function, $H_{opt}$, by least a square regression calculation over all the non-aberrant pixel pairs in order to produce the rough homography $H_g$,
    a third, fine resetting phase including, after application of the rough homography function $H_g$ to the model, determining a fine homography function, $H_f$.

2. A method according to claim 1, wherein the preliminary phase of determination of an average resetting homography comprises:
    selecting at least one sample picture among a collection of pictures taken of the given location,
    detecting the references on the sample picture(s), and
    calculating an average homographic function, $H_m$, enabling superimposition between the model subjected to the average homographic function and the sample picture(s),
    wherein superimposition is reached for least error square minimization of the distance between reference points of sample picture(s) and the model subjected to the average homographic function.

3. A method according to claim 1, wherein in the second, rough resetting phase:
    for the horizontal reference distance matrix $M_{dh}$ each element of said matrix specifies the distance in number of pixels relative to the reference line along a vertical axis, the distance values on the reference line and those of a column without any reference line pixel being nil, the distance values along the vertical line increasing in absolute value as the element moves away relative to the reference line, the distance values of the elements being of opposite signs on both sides of the reference line, for the vertical reference distance matrix $M_{dv}$ each element of said matrix specifies the distance in number of pixels relative to the reference line along a horizontal axis, the distance values on the reference line and those of a line without reference line pixel being nil, the distance values along the horizontal line increasing in absolute value as the element moves away relative to the reference line, of the elements being of opposite signs on both sides of the reference line, with, for each pixel p(i,j) of the average adjusted matrix derived from a reset pixel of the model belonging to a vertical reference line and positioned at the line i and at the column j of the average adjusted matrix $M_{am}$, the allocation of a corresponding pixel obtained by adding the value v in i and j of the vertical reference matrix $M_{rv}$ to the value j, and matching the pixels, and
    for pixels matching, for each pixel p(i,j) of the average adjusted matrix derived from a reset pixel of the model belonging to a horizontal reference line and positioned at the line i and at the column j of the average adjusted matrix $M_{am}$, the allocation of a corresponding pixel obtained by adding the value v in i and j of the horizontal reference matrix $M_{rh}$ to the value i, and matching the pixels, and the homography function $H_{opt}$ calculated by regression with minimisation of the medial of the square of the distance between pairs of matched pixels, is carried out over n collections of four pairs of matched pixels, 4. A method according to the claim 3, wherein, in the binary average adjusted matrix $M_{am}$, the pixels take on the value 1 if they correspond to a reference pixel of the reset model and 0 if not, and, in the fourth step of the second rough resetting step, a pair of pixels corresponds to a non-aberrant match, if, for the pixel of the average adjusted matrix $M_{am}$ of the match, the distance between the pixel matched by using the reference matrices $M_{rh}$, $M_{rv}$, and that obtained by the homography $H_{opt}$ is smaller than or equal to a preset threshold.

5. A method according to claim 3, wherein the reference detection criteria include at least one of:
- a specific colour of the reference with respect to the remainder of the scene,
- a specific tone of the reference with respect to the remainder of the scene,
- a specific grey level of the reference with respect to the remainder of the scene,
- a specific shape of the reference, notably a line, an angle between two lines crossing each other, a parallelism between two lines,
- a specific orientation of the reference, and
- a line closest and parallel to an edge of the picture matrix.

6. A method according to claim 3, wherein the extraction process comprises a preliminary Cany-Deriche filtering step of the picture in order to obtain a gradient picture and that the process continues with the gradient picture.

7. A method according to claim 1, wherein in the third, fine resetting phase, the rough homography $H_g$ is applied to the model and the result is compared to both horizontal and vertical distance matrices with adjustment of the homography by a Powel alternate single-dimension iterative minimisation method.

8. A method according to claim 1, wherein the pictures evolve with time according to sequences corresponding to different shot locations and/or angles and in that the electronic device comprises means enabling moreover to determine during the first, average resetting preliminary phase, as many average homography functions $H_m$ as there are different shot locations and angles.

9. A method according to claim 1, wherein the phases and steps are implemented in the electronic means which are programmable logic units with a program and that the programmable logic comprises a microprocessor or a digital signal processor and, of the general-purpose or dedicated microcomputer type.

10. A method according to claim 1, wherein the scene is a sports ground including references in the form of delineating lines, notably a European or American "football" pitch or a tennis ground.

11. Automatic resetting device using electronic means intended for a geometric model of a scene over a picture of the scene, the model and the picture of the scene being stored in the memory of an electronic device in the form of pixel matrices, the scene including fixed references with respect to the remainder of the scene, wherein the references can be detected within the matrices, the picture being taken by a camera arranged in a given zone with respect to the ground in a location of the zone and according to a shot angle determined relative to the scene, wherein the electronic means compares the picture with the model having been adjusted in perspective by homography for superimposition of the references, and wherein the electronic device comprises means enabling to calculate a fine homography function $H_f$ for resetting into three main phases:
- a first preliminary phase of determination of an average resetting homography including determining an average homography function $H_m$ applicable to the model with average adjustment over a sample of pictures of the scene taken previously,
- a second, rough resetting phase including, after application of the average homography function $H_m$ to the model, determining a rough homography function $H_g$, said second rough resetting phase comprising the steps of:
  - applying an extraction process to the picture enabling, according to detection criteria, to detect in the picture matrix of the pixels which can represent references of the scene and to form a first picture reference binary matrix $M_{rh}$, including horizontal contour points and a second picture reference binary matrix, $M_{rv}$, including vertical contour points,
  - calculating for each horizontal reference binary matrix, $M_{rh}$, a horizontal reference distance matrix $M_{dh}$, including for each element of the matrix the distance value with respect to the closest reference according to the vertical line,
  - calculating for each vertical reference binar matrix, $M_{rv}$, a vertical reference distance matrix, $M_{dv}$, including for each element of the matrix the distance value with respect to the closest reference according to the horizontal line,
  - applying all the reference lines of the model to the average homographic function $H_m$ in order to produce a binary average adjusted matrix $M_{am}$ which is compared with the vertical $M_{dv}$, and respective horizontal $M_{dh}$ reference distance matrices, for pixel matching purposes, and calculating a homography function $H_{opt}$ by regression with minimization of the medial of the square of the distance between pairs of matched pixels,
  - identifying the pairs of pixels corresponding to non-aberrant matches,
  - adjusting the homography function, $H_{opt}$, by least a square regression calculation over all the non-aberrant pixel pairs in order to produce the rough homography $H_g$,
- a third, fine resetting phase including, after application of the rough homography function $H_g$ to the model, determining a fine homography function $H_f$.

12. A device according to claim 11, wherein the electronic means are of the general-purpose or dedicated microcomputer type.

13. An information storage medium including a program intended for operating the device of claim 11.

14. An information storage medium including a program intended for operating the device of claim 11.

* * * * *